United States Patent [19]

Kimura

[11] Patent Number: 5,684,942

[45] Date of Patent: Nov. 4, 1997

[54] IMAGE PROCESSING APPARATUS AND METHOD FOR GENERATING A THIRD IMAGE FROM FIRST AND SECOND IMAGES

[75] Inventor: Hiroyuki Kimura, Yokohama, Japan

[73] Assignee: Canon Kabushiki Kaisha, Tokyo, Japan

[21] Appl. No.: 264,746

[22] Filed: Jun. 22, 1994

Related U.S. Application Data

[63] Continuation of Ser. No. 934,329, Aug. 25, 1992, abandoned.

[30] Foreign Application Priority Data

Aug. 30, 1991 [JP] Japan ................. 3-220672

[51] Int. Cl.⁶ ........................................ G06F 15/00
[52] U.S. Cl. .................... 345/473; 345/431; 345/475
[58] Field of Search ........................ 395/118, 119, 395/120, 173, 175, 949, 951; 345/122, 125

[56] References Cited

U.S. PATENT DOCUMENTS

| | | | |
|---|---|---|---|
| 4,189,743 | 2/1980 | Schure et al. | 345/122 |
| 4,797,836 | 1/1989 | Witek et al. | 395/152 |
| 4,952,051 | 8/1990 | Lovell et al. | 352/87 |
| 4,953,227 | 8/1990 | Katsuma et al. | 382/18 |
| 4,956,872 | 9/1990 | Kimura | 382/44 |
| 4,958,217 | 9/1990 | Kimura et al. | 358/75 |
| 5,003,496 | 3/1991 | Hunt et al. | 395/130 |
| 5,053,760 | 10/1991 | Frasier et al. | 345/122 |
| 5,070,465 | 12/1991 | Kato et al. | 395/141 |
| 5,164,825 | 11/1992 | Kobayashi et al. | 358/160 |
| 5,252,953 | 10/1993 | Sandrew et al. | 345/122 |
| 5,390,291 | 2/1995 | Ohashi | 395/119 |

*Primary Examiner*—Mark R. Powell
*Assistant Examiner*—Ba Huynh
*Attorney, Agent, or Firm*—Fitzpatrick, Cella, Harper & Scinto

[57] ABSTRACT

An image processing apparatus and method for handling digital image data having tones, in which, for each of a plurality of types of digital image data that have been input, an area is set, the digital image data in each area set are transformed and digital image data are created in between by combining each of the items of digital image data transformed.

18 Claims, 11 Drawing Sheets

IMAGE PROCESSING APPARATUS AND METHOD FOR GENERATING A THIRD IMAGE FROM FIRST AND SECOND IMAGES

This application is a continuation of application Ser. No. 07/934,329 filed Aug. 25, 1992, now abandoned.

BACKGROUND OF THE INVENTION

This invention relates to an image processing apparatus and method and, more particularly, to an image processing apparatus and method having a function for combining a plurality of original images, by way of example.

Figure 1A:
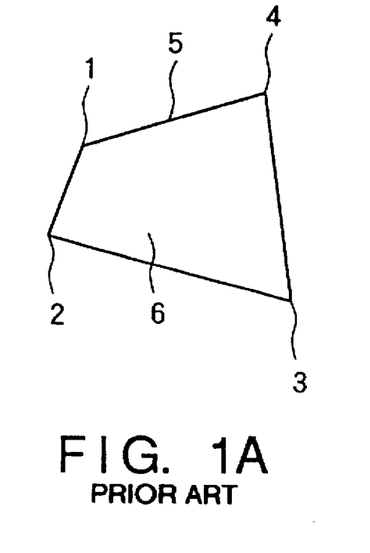
FIGS. 1A and 1B and FIG. 2 are diagrams illustrating an example of image creating according to the prior art.
Figure 1B:
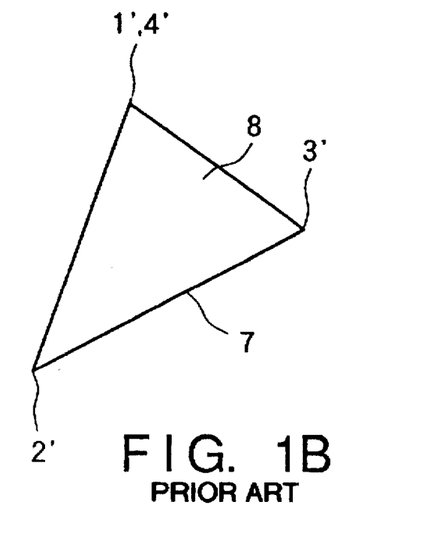
Figure 2:
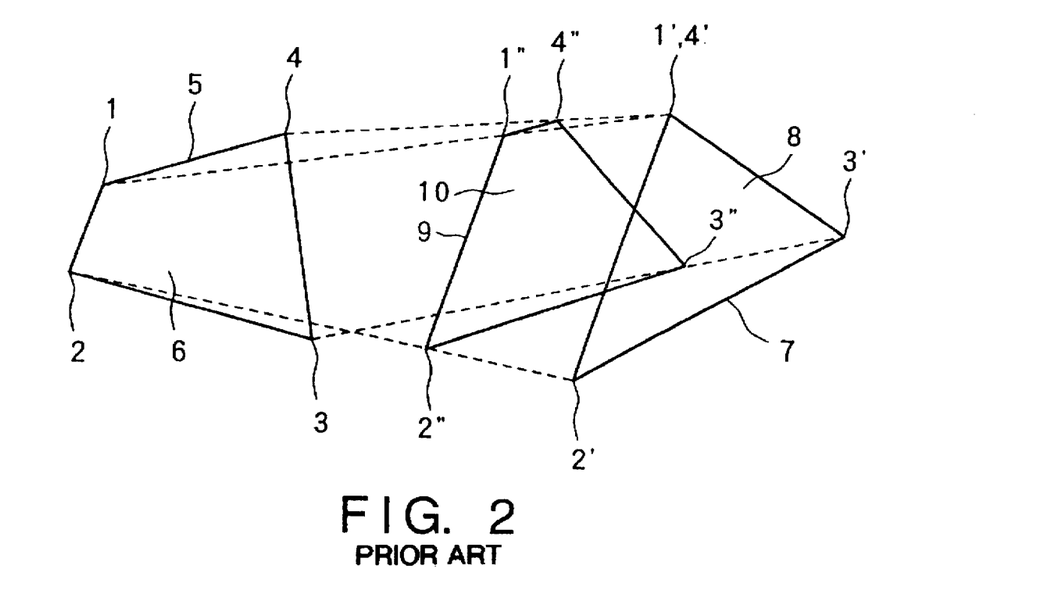

In conventional techniques for producing animations using a computer, there is a so-called "in-between" technique. This involves creating two images serving as key frames and then automatically creating an image, namely an intermediate image, between the two created images. FIGS. 1A, 1B and FIG. 2 will be used to describe an example in which an intermediate image is created from two types of key-frame images, one quadrangular and one triangular.

FIG. 1A illustrates a quadrangular key-frame image, and FIG. 1B shows a triangular key-frame image.

First, as shown in FIG. 1A, characteristic points 1, 2, 3, 4 of the first key-frame image are designated, then these points are connected to form a closed contour 5. Further, a color (not portrayed in FIG. 1A), namely a color which paints out the interior 6 of the created contour 5, is designated.

Next, as shown in FIG. 1B, characteristic points 1', 2', 3', 4' of the second key-frame image are designated so as to correspond to the characteristic points 1, 2, 3, 4 of the first key-frame image. In the second key-frame image, the characteristic points 1' and 4' occupy the same position. A color (not portrayed in FIG. 1B), namely a color which paints out the interior 8 of the created closed contour 7, is designated.

So far, this represents preparations performed in advance. Using these data, a computer automatically creates the aforementioned intermediate image. The details of this processing will now be described with reference to FIG. 2. It should be noted that items of data identical with those shown in FIGS. 1A, 1B are indicated by like reference numerals.

First, the computer connects the corresponding characteristic points 1 and 1', 2 and 2', 3 and 3', 4 and 4' of the first and second key-frame images and finds points 1", 2", 3", 4" having a designated internal dividing ratio. In the example of FIG. 2, the internal dividing ratio is found at a ratio of 7:3. Next, the computer connects the characteristic points, which have thus been obtained by internal division, in a designated sequence to obtain a contour 9. Thereafter, the computer paints out the interior 10 of the contour 9 in a color obtained by mixing, at the same internal dividing ratio, the color painting out the interior 6 of the first key-frame image and the color painting out the interior 8 of the second key-frame image.

Thus, a new image having an intermediate shape and color can be creating automatically using the first key-frame image and the second key-frame image.

However, the prior-art technique described above is usable only when handling images in which there are contour lines and the interiors of the closed contours are painted out in a uniform color, as in computer animation. Intermediate images cannot be created using natural pictures taken by photography and paintings such as oil paintings and watercolors as the key-frame images. Moreover, the work involved in designating the correspondence sequence of the contour lines is extremely laborious. The difficulty of this work lowers the productivity of computer animation.

SUMMARY OF THE INVENTION

An object of the present invention is to provide an image processing apparatus capable of solving the foregoing problems.

Another object of the present invention is to provide an image processing apparatus capable of readily creating an intermediate image from images having no contour lines, such as natural pictures and paintings.

Still another object of the present invention is to provide an image processing apparatus capable of facilitating work even when an intermediate image is created from original images having contour lines, such as in computer animation.

A further object of the present invention is to provide an image processing apparatus for handling image data having tones, wherein the apparatus comprises setting means for setting any area for each of a plurality of types of image data that have been input, transforming means for transforming the image data in each area set by the setting means, and creating means for creating image data in between by combining each of the items of image data transformed by the transforming means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 3:
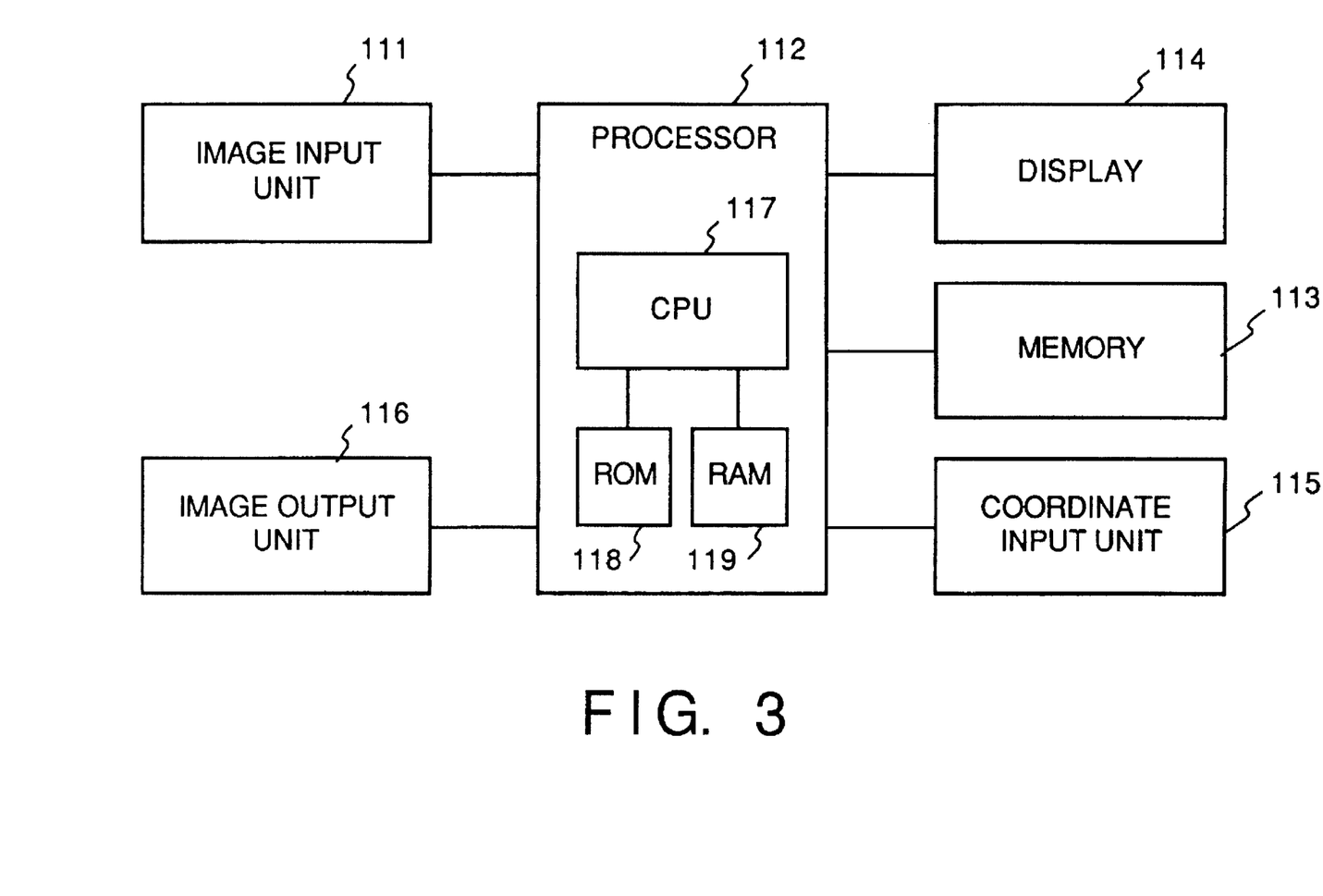
FIG. 3 is a block diagram illustrating the construction of an image processing apparatus according to an embodiment of the present invention.

FIG. 3 is a block diagram showing the construction of an image processing apparatus according to an embodiment of the present invention. The apparatus includes an image input unit 111, such as a scanner, for reading a document and inputting original image data. Two frames of original input data of the document input by the image input unit 11 are sent to a processor 112. All processing applied to the input digital image data is executed by the processor 112. In addition, the processor 112 performs transfer of image data and exchange of control data with the image input unit 111, a memory 113, a display unit 114, a coordinate input unit 115 and an image output unit 116, and carries out control of the overall system.

The memory 113 is for storing information such as image data. The original image data read in by the image input unit 111 is stored in the memory 113 under the control of the processor 112, and information such as processing programs required by the processor 112, image data and control data is read out of the memory 113 under the control of the processor 112.

The display unit 114 displays images and characters. In accordance with commands from the processor 112, the display unit 114 displays images, a cursor which indicates a coordinate position input by the coordinate input unit 115, the particulars of the particular job and the content of processing currently being executed. The coordinate input unit 115 is a mouse, a digitizer or the like. A coordinate position designated by the coordinate input unit 115 is read constantly by the processor 112, and the position is displayed on the display unit 114 in the form of the cursor. As will be described below, the coordinate input unit 115 is used to designate an image area and to select commands or parameters. The image output unit 116 is an ink-jet printer, a color-laser printer or the like and is used in order to output an image, which has been processed by the processor 112, as a still-picture print.

The processor 112 includes a CPU 17 which controls the overall apparatus, a ROM 118 for storing programs executed by the CPU 17, such as programs in accordance with the flowcharts of FIGS. 4–8 and FIG. 12, and a RAM 119 used as a work area for various programs.

Processing executed by the image processing apparatus of this embodiment will now be described with reference to the flowchart of FIG. 4.

Figure 4:
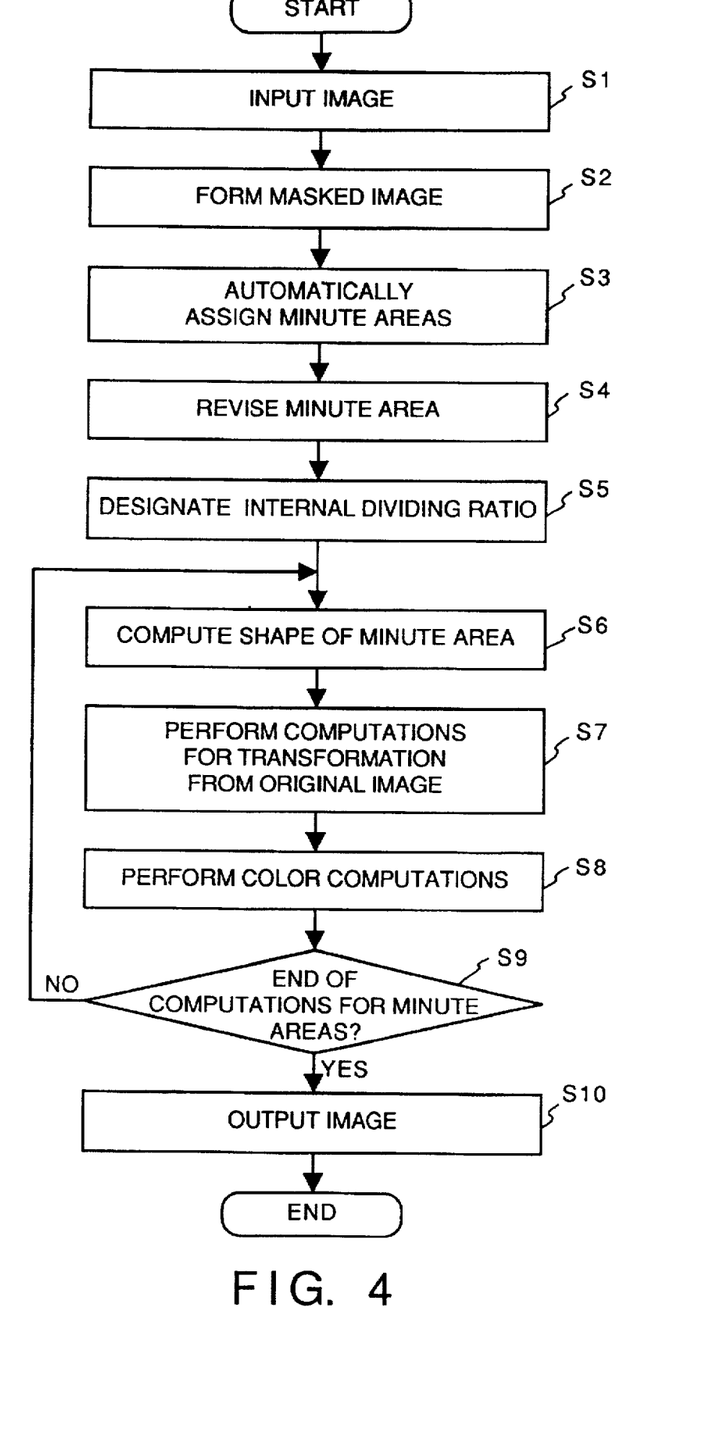
FIG. 4 is a flowchart for describing the main operation of this embodiment.

FIG. 4 is a flowchart for describing the main operation of the present embodiment.

Step S1 of the flowchart is for image input. Two original images are required in the processing of this embodiment. Accordingly, two original images are input as original-image data (digital image data) using the image input unit 111 of FIG. 1, and the input original-image data are stored in the memory 113 via the processor 112. In a case where use is made of original images such as photographs and printed matter that do not possess contour lines, the image input unit 111 should be a device which performs an analog-digital conversion using an image sensor such as a CCD while scanning the image. Examples are well-known film scanners and flat-bed scanners. The image data digitized by the input unit 111 is stored in the memory 113 through the processor 112.

In a case where the original images are solids, they can be photographed by a camera in advance and input using the aforementioned film scanner. If a video camera is used, input is possible if use is made of a well-known video-camera device as the image input unit 111. The video-camera device is one which subjects one field or one frame of a video signal to an analog/digital conversion. Any single frame of the video can be digitized. The digitized image data are stored in the memory 113 via the image processor 112. If the original image is one which has already been digitized, as in the manner of an image created by a computer-graphics program, it will suffice to use a device which reads the digital data in directly, as in the manner of a well-known MT (magnetic-tape) device, as the image input unit 111. The digital image data thus read in is stored in the memory 113 via the processor 112.

Step S2 of the flowchart is for creating a masked image. The data of the two input original images will not necessarily be indicative of an area used in subsequent processing in the entire screen. Consequently, an area used in subsequent processing is designated from the entirety of the original image. This is performed at step S2, at which a masked image for distinguishing between an area used in processing and an area not used in processing is created. Creation of the masked image is performed with regard to each of the two original images. The two masked images created are stored in the memory 113 as two pages of masked image data. The details of step S2 will be described in accordance with the flowchart of FIG. 6.

Figure 6:
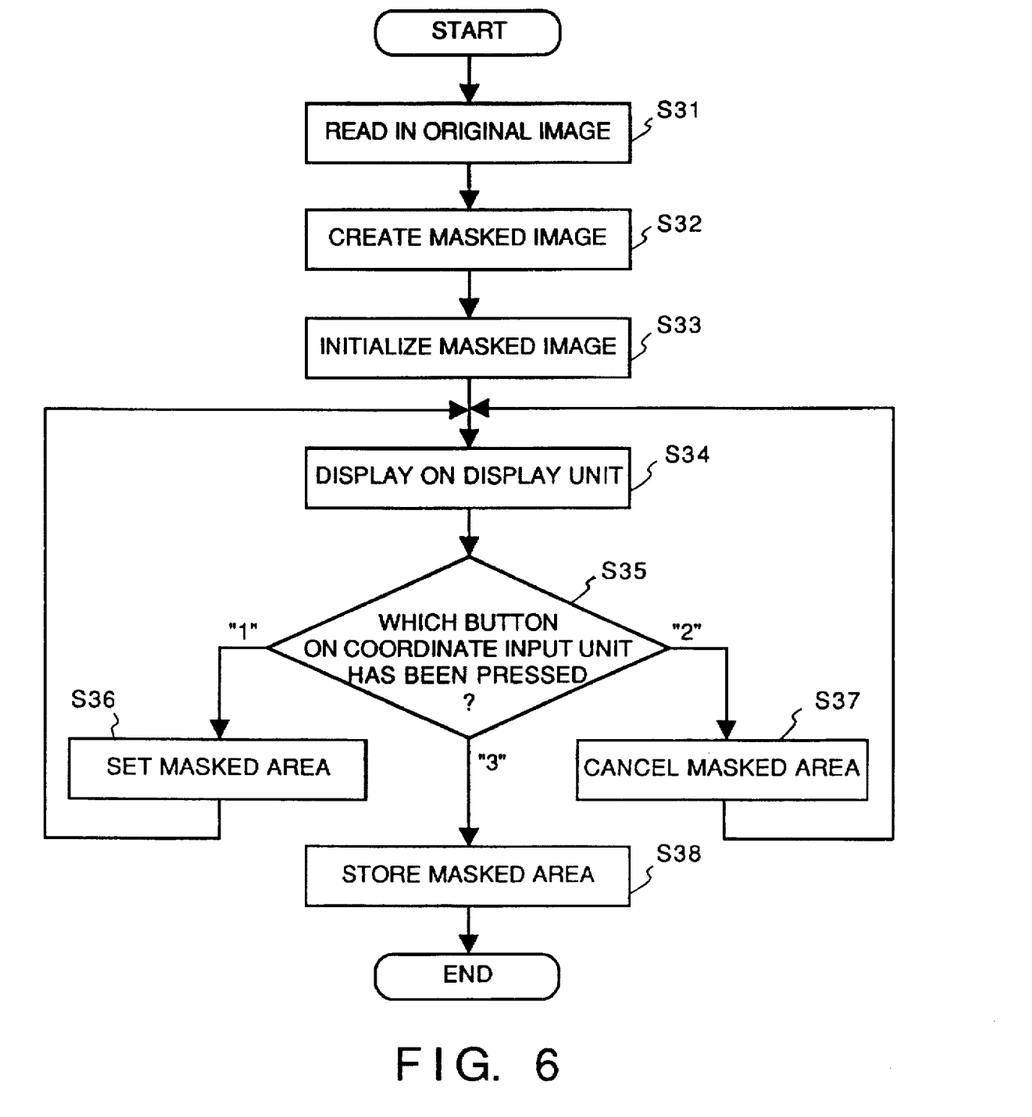
FIG. 6 is a flowchart for describing an operation for creating a masked image according to the embodiment.

FIG. 6 is a flowchart for describing the operation for creating masked images according to this embodiment.

First, at step S31, the original-image data of one document stored in the memory 113 are read in the processor 112. Next, at step S32, an area for a masked image having the same size as that of the original image is created in the processor 112. It should be noted that the masked image is composed of pixels, in which one pixel is expressed by one bit represented by "0" or "1". Next, in order to initialize the masked image, all bit values are set to "0" at step S33.

This is followed by step S34, at which the original image and the masked image are displayed on the display unit 114 in superimposed form. In a case where the bits of the corresponding pixels of the masked image are "0", the masked image is transparent so that the underlying original image may be seen. On the other hand, if the bits of the corresponding pixels of the masked image are "1", a specific color, such as the color red, is displayed as the masked image. In other words, in the latter case, the original image cannot be seen since it is painted out by the masked image of the specific color. In the initial state, all bits of the masked image are "0", and therefore the original image can be seen in its entirety.

Next, at step S35, a masked area is set using the coordinate input unit 115, such as a mouse. The coordinate input unit 115 causes a cursor corresponding to the position of entered coordinates to be displayed on the display unit 114. To this end, in order to bring the cursor to a desired position, the coordinate input unit 115 is moved and stopped, at which position a button (not shown) on the coordinate input unit 115 is pressed. When this is done, processing is executed at the coordinate position designated by the cursor. The coordinate input unit 115 has three types of buttons (not shown), and a different type of operation corresponding to each pressed button can be performed. When a first button is pressed, the program proceeds to step S36, described below, whereby a masked area is set at the cursor position. When a second button is pressed, the program proceeds to step S37, described below, to cancel the masked area at the cursor position. When setting of the masked area ends, a third button is pressed to execute the processing of step S38, described below.

Step S36 represents processing for setting the masked area. When the first button on the coordinate input unit 115 is pressed, the processor 112 sets the bit of the pixel designated on the masked image by the cursor to "1". Thereafter, the program returns to step S34, whereupon the position of this pixel on the display unit 114 is converted into a specific color for a masked image, as a result of which the original image can no longer be seen.

Step S37 is a process for canceling a masked area. When the second button on the coordinate input unit 115 is pressed, the processor 112 sets the bit of the pixel designated on the masked image by the cursor to "0". Thereafter, the program returns to step S34, whereupon the position of this pixel on the display unit 114 has the specific color for the masked image erased, as a result of which the original image can be seen.

At step S38, the processor 112 stores the created masked image data in the memory 113. As a result of this processing, the setting of the masked area ends. Since the setting of a masked area is carried out with regard to the original-image data of two documents stored in the memory 113, the foregoing processing is executed also with respect to the original-image data of the other original stored in the memory 113.

Once again with reference to FIG. 4, step S3 is a step for automatically assigning minute areas. A preset number of minute areas, specifically minute quadrangular areas, are automatically assigned to the masked area (created at step S2) of the data of each original image inputted at step S1. The quadrangles are set so as not to overlap one other and so as to cover the entirety of the masked areas. This procedure is carried out with regard to each of the two original images.

The details of this processing will be described using the flowchart of FIG. 5 as well as FIG. 7.

Figure 5:
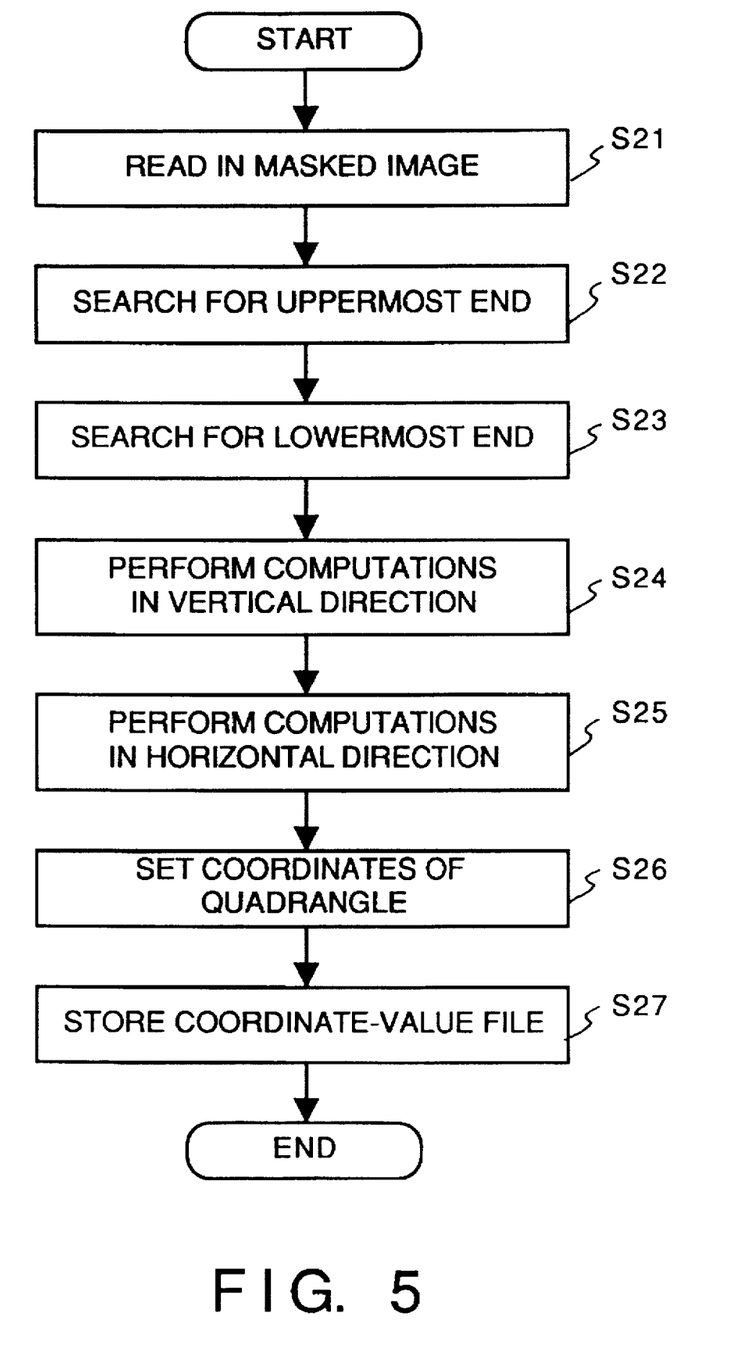
FIG. 5 is a flowchart for describing an operation in which minute areas are automatically assigned according to this embodiment.
Figure 7:
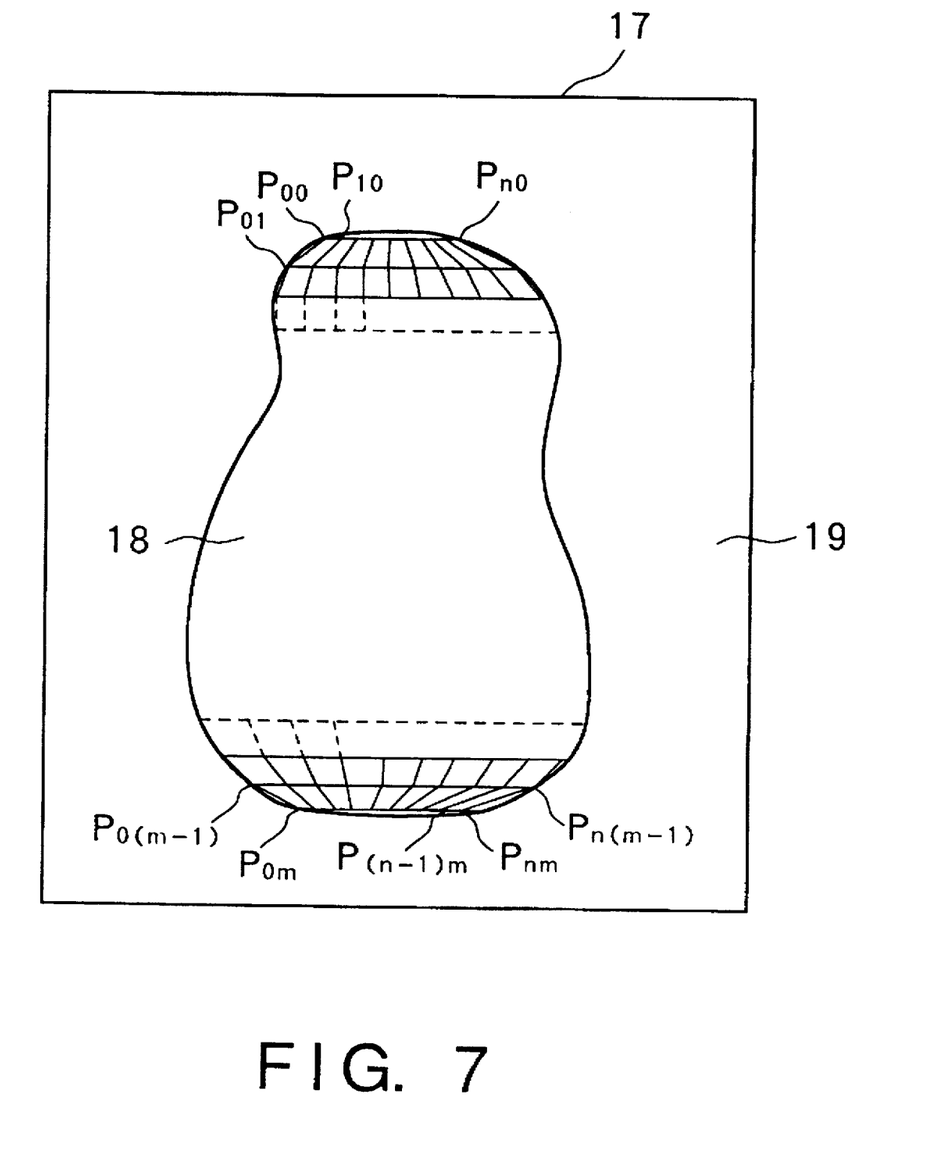
FIG. 7 is a diagram which gives a supplementary explanation of FIG. 5.

FIG. 5 is a flowchart for describing the operation through which minute areas are automatically assigned according to this embodiment, and FIG. 7 is a diagram which facilitates an understanding of the operation. In the description that follows, it will be assumed that n minute quadrangular areas are set in the horizontal direction and m minute quadrangular areas are set in the vertical direction in the masked area of original image.

At step S21 in FIG. 5, masked-image data 17 stored in the memory 113 are read in the processor 112. In the masked-image data 17, let numeral 18 denote a masked area, in which the bits are set at "1", and let numeral 19 denote an unmasked image, in which the bits are set at "0". Next, at step S22, the masked-image data 17 are scanned from the top, and the leftmost pixel and rightmost pixel where a "1" bit is present as the masked-image data are found for every line. The position of the first pixel for which the distance between the leftmost pixel and the rightmost pixel exceeds a predetermined width in correspondence with the number n of pixels in the horizontal direction of the quadrangles is adopted as the uppermost end for assigning quadrangular areas, and the pixels of the leftmost and rightmost ends at this time are designated by $P_{00}$, $P_{n0}$, respectively.

This is followed by step S23, at which the masked-image data 17 are scanned from the bottom and a leftmost pixel and rightmost pixel where a "1" bit is present as the masked-image data are found for every line. The position of the first pixel for which the distance between the leftmost pixel and the rightmost pixel exceeds a predetermined width in correspondence with the number n of pixels in the horizontal direction of the quadrangles is adopted as the lowermost end for assigning quadrangular areas, and the pixels of the leftmost and rightmost ends at this time are designated by $P_{0m}$, $P_{nm}$, respectively.

Next, at step S24, the distance between the uppermost end and lowermost end (obtained at steps S22, S23 respectively) of the quadrangular areas is equally divided by the number m of quadrangles in the vertical direction (the subordinate scanning direction), and leftmost pixels $P_{01}$, $P_{02}$, ..., $P_{0(m-1)}$ and rightmost pixels $P_{n1}$, $P_{n2}$, ..., $P_{n(m-1)}$ for which the masked-image data area "1" bits are found on each line resulting from the aforementioned division. The coordinate values, in the vertical direction, of the pixels thus equally divided are used as the Y coordinate values of the quadrangles.

Next, step S25 is for finding coordinate values $P_{10}$, $P_{20}$, ..., $P_{(n-1)0}$; $P_{11}$, $P_{21}$, ..., $P_{(n-1)1}$; ...; $P_{1m}$, $P_{2m}$, ..., $P_{(n-1)m}$, which are obtained by equally dividing, by the number n of quadrangles in the horizontal direction (main scanning direction), the distance between the leftmost pixel $P_{00}$ and rightmost pixel $P_{n0}$ at the uppermost end of the quadrangular areas found at step S22, the distance between the leftmost pixel $P_{0m}$ and rightmost pixel $P_{nm}$ at the lowermost end of the quadrangular areas found at step S23, and the distances between the leftmost pixels $P_{01}$, $P_{02}$, ..., $P_{0(m-1)}$ and rightmost pixels $P_{n1}$, $P_{n2}$, ..., $P_{n(m-1)}$ on the lines equally divided at step S24. The coordinate values, in the horizontal direction, of the pixels thus equally divided are used as the X coordinate values of the quadrangles.

At step S26, all sets of four mutually adjacent pixels, namely sets $[P_{00}, P_{01}, P_{11}, P_{10}]$, $[P_{10}, P_{11}, P_{21}, P_{20}]$, ..., $[P_{(n-1)(m-1)}, P_{(n-1)m}, P_{nm}, P_{n(m-1)}]$, are produced using the pixels $P_{00}$ to $P_{nm}$ obtained by the processing of steps S22 to S25, and these are adopted as sets of four coordinate values representing minute quadrangles.

Finally, at step S27, the sets of coordinate values of the minute quadrangles created at step S26 are stored in the memory 113 as a file of coordinate values of the small quadrangles.

The foregoing processing is applied to the two masked images, so that two files of coordinate values of minute quadrangles are automatically created. It should be noted that these two files of coordinate values are written in an order in which all quadrangles in one file will correspond to all quadrangles in the other file. In addition, the four coordinate values of the minute quadrangles are all written in an order in which they will correspond.

Thus, in the present embodiment, the two original images are divided into minute areas automatically using masked images in which areas of the original images are designated. This means that the task of inputting coordinate values individually in order to demarcate the minute areas is unnecessary, and therefore a characterizing feature of the embodiment is that operation is greatly simplified.

With reference again to FIG. 4, step S4 is for correcting the minute areas. Though minute areas are automatically allocated at step S3, a transformation such as a correction or modification can be made at the volition of the operator. The details of this processing will be described with reference to the flowchart of FIG. 8.

Figure 8:
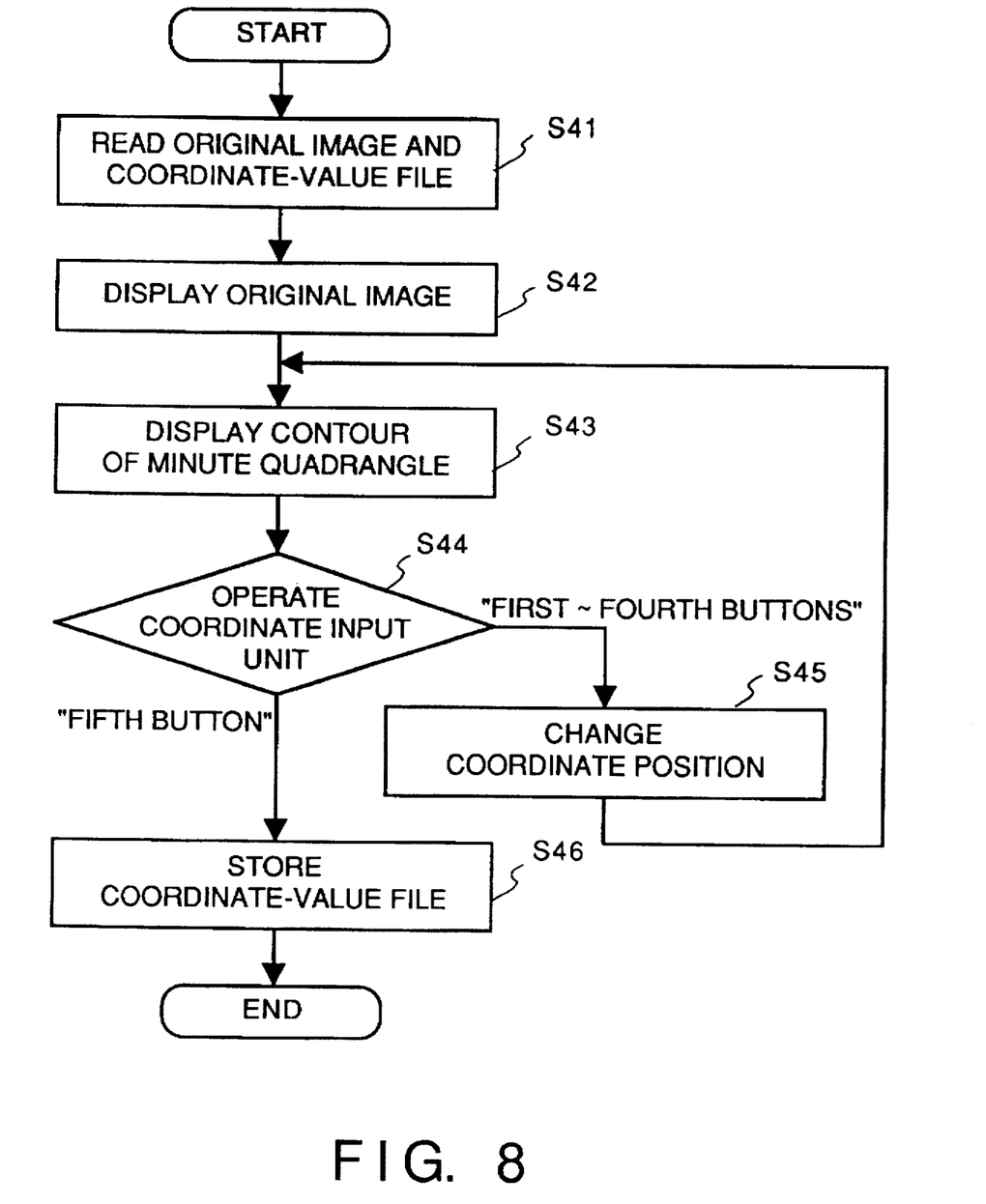
FIG. 8 is a flowchart for describing an operation for revising minute areas according to the embodiment.

FIG. 8 is a flowchart for describing an operation through which the minute areas are corrected according to this embodiment.

First, step S41 calls for the original-image data and coordinate-value file for one document to be read from the memory 113 to the processor 112. The original image is displayed on the display unit 114 at step S42.

Next, at step S43, the contours of all quadrangles written in the coordinate-value file are displayed in a predetermined specific color on the display unit 114 in such a manner that they will overlap the corresponding coordinate values of the original-image data. This is followed by step S44, at which the button on the coordinate input unit 115 pressed by the operator, as well as the positions at which the button was pressed and released, is detected. Here it is assumed that the five buttons (not shown) on the coordinate input unit 115 are used. The first through fourth buttons correspond to the first through fourth coordinate values of each set of the four coordinate values of the minute quadrangles. When any one of these buttons is pressed, a change in the coordinate value is judged and the program proceeds to step S45. If the fifth button is pressed, an end to the processing of step S44 is judged and the program proceeds to step S46.

At step S45, the position at which the particular button of the coordinate input unit 115 was pressed is investigated, as well as the coordinate value, in the coordinate-value file, that corresponds to the pressed button. The coordinate value for which the distance is shortest within a predetermined distance is changed to the coordinate value of the position at which the button on the coordinate input unit 115 was released. It does not matter whether any of the first through fourth buttons of the coordinate input unit 115 are pressed simultaneously.

The details of this processing will be described in detail in accordance with FIGS. 9A, 9B and 9C.

Figure 9A:
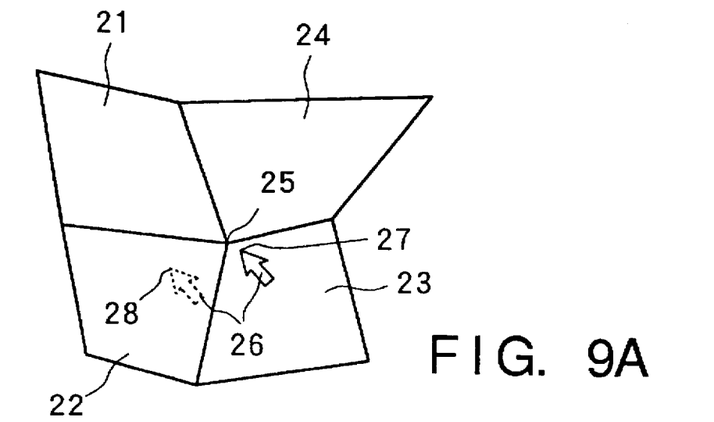
FIGS. 9A, 9B and 9C are diagrams which give a supplementary explanation of FIG. 8.
Figure 9B:
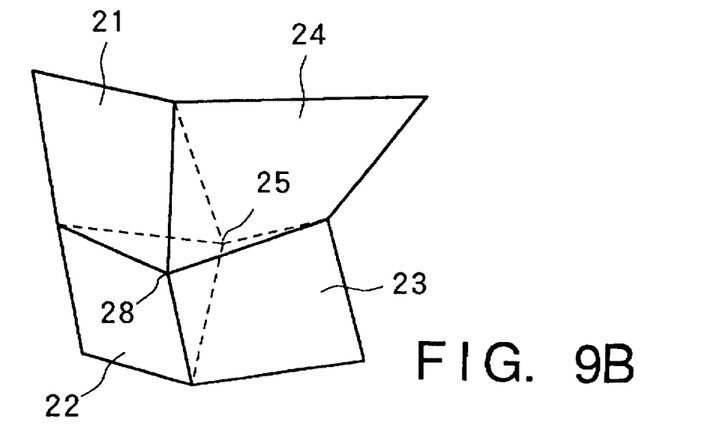
Figure 9C:
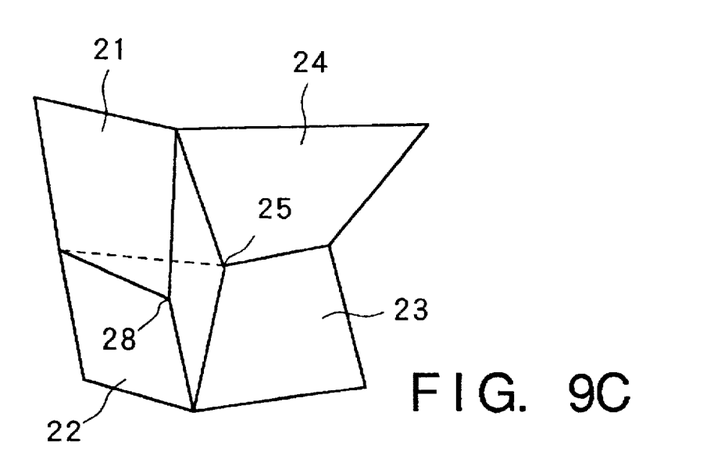

FIGS. 9A, 9B and 9C are diagrams for describing the foregoing in further detail. There are four minute quadrangles 21, 22, 23 and 24 in FIG. 9A. Assume that the coordinates of the coordinate-value file are arranged in the following order: upper left, lower left, lower right and upper right. These four minute quadrangles 21, 22, 23 and 24 share a common vertex 25, which has the third coordinate value of the first minute quadrangle 21, the fourth coordinate value of the second minute quadrangle 22, the first coordinate value of the third minute quadrangle 23 and the second coordinate value of the fourth minute quadrangle 24.

Assume that the first through fourth buttons (not shown) on the coordinate input unit 115 are pressed simultaneously when the cursor 26 is at a position 27 near the vertex 25, and that the buttons are released when the cursor 26 is as a position 28. At this time the distances between all of the first through fourth coordinate values of the coordinate-value file and the coordinate value of the position 27 are investigated. As a result, the third coordinate value of the minute quadrangle 21, the fourth coordinate value of the minute quadrangle 22, the first coordinate value of the minute quadrangle 23 and the second coordinate value of the minute quadrangle 24 are judged to be at the nearest position. These four coordinate values are replaced by the coordinate values 28 of the position at which the buttons on the coordinate input unit 115 were released. As a result, the vertex 25 moves to the position 28, as illustrated in FIG. 9B.

Further, assume that the third and fourth buttons (not shown) on the coordinate input unit 115 are pressed when the cursor 26 is at the position 27 close to the vertex 25, and that these buttons are released when the cursor is at the position 28. At this time the distances between the third and fourth coordinate values of the coordinate-value file and the coordinate value of the position 27 are investigated. As a result, the third coordinate value of the minute quadrangle 21 and the fourth coordinate value of the minute quadrangle 22 are judged to be at the nearest position. These two coordinate values are replaced by the coordinate values 28 of the position at which the buttons on the coordinate input unit 115 were released. As a result, the vertex 25 is split into the vertex 28 of the small quadrangles 21, 22 and the vertex 25 (this position is unchanged) of the small quadrangles 23, 24, and a hole is produced at the center, at illustrated in FIG. 9C.

When the coordinate-value file is thus rewritten, the program returns to step S43, where the contours of the small quadrangles are re-drawn in accordance with the coordinate-data file just rewritten.

In a case where there are no pertinent coordinate values near the position at which the buttons on the coordinate input unit were released, no change whatsoever is made at step S45 and therefore the contours are not changed by the re-drawing operation of step S43.

When revision of the coordinate values is thus completed, the fifth button (not shown) on the coordinate input unit 115 is pressed. As a result, the program proceeds to step S46, at which the file of revised coordinate values is again stored in the memory 113, after which the revision operation is completed. It should be noted that this operation is applied to both files of the coordinate value of minute quadrangles.

By thus performing the foregoing operation, the position of the vertex of small quadrangles can be moved freely, a vertex can be split into minute quadrangles, and holes and slits can be created (when the operation is performed at the edge of the mask without pressing any of the four buttons, a slit and not a hole is created). By freely combining these operations, the minute areas automatically allocated at step S3 can be readily changed as desired.

Again with reference to FIG. 4, step S5 is for designating an internal dividing ratio a ($0 \leq a \leq 1$). Specifically, the ratio at which the two original images are combined at step S2 to create an image is designated. The designation of this internal dividing ratio a may be performed using an alpha-numeric input unit such as a keyboard (not shown) or by entering the designation in the form of the coordinate values of a position at which a button on the coordinate input unit 115 is pressed.

Steps S6 to S8 are for calculating individual minute quadrangular areas.

First, at step S6, the shapes of minute areas are calculated, one of mutually corresponding minute quadrangles is selected from the files of the two sets of coordinate values of quadrangles, and the shape of the quadrangle at an internal-division position is obtained by calculation using the internal dividing ratio n given at step S5.

Let $(x_{00}, y_{00})$, $(x_{01}, y_{01})$, $(x_{02}, y_{02})$, $(x_{03}, y_{03})$ represent the four coordinate values of a minute quadrangle of the first original image, and let the four coordinate values of a corresponding minute quadrangle of the second original image be represented by $(x_{10}, y_{10})$, $(x_{11}, y_{11})$, $(x_{12}, y_{02})$, $(x_{13}, y_{13})$ in an order corresponding to that of the first original image. In such case, if the coordinate values of an internally divided quadrangle obtained by transformation are $(X_0, Y_0)$, $(X_1, Y_1)$, $(X_2, Y_2)$, $(X_3, Y_3)$ in the order corresponding to that of the first original image, then the coordinates can be obtained through the following calculations:

$$X_0 = a \times x_{00} + (1.0 - a) \times x_{10},$$

$$Y_0 = a \times y_{00} + (1.0 - a) \times y_{10},$$

$$X_1 = a \times x_{01} + (1.0 - a) \times x_{11},$$

$$Y_1 = a \times y_{01} + (1.0 - a) \times y_{11},$$

$$X_2 = a \times x_{02} + (1.0 - a) \times x_{12},$$

$$Y_2 = a \times y_{02} + (1.0 - a) \times y_{12},$$

$$X_3 = a \times x_{03} + (1.0 - a) \times x_{13},$$

$Y_3 = a \times y_{03} + (1.0-a) \times y_{13}$

Step S7 is for performing transformation calculations based upon the original-image data. The transformation calculations are applied to each of the internally divided quadrangular areas obtained at step S6 from the minute quadrangular areas of the two original images.

Figure 10A:
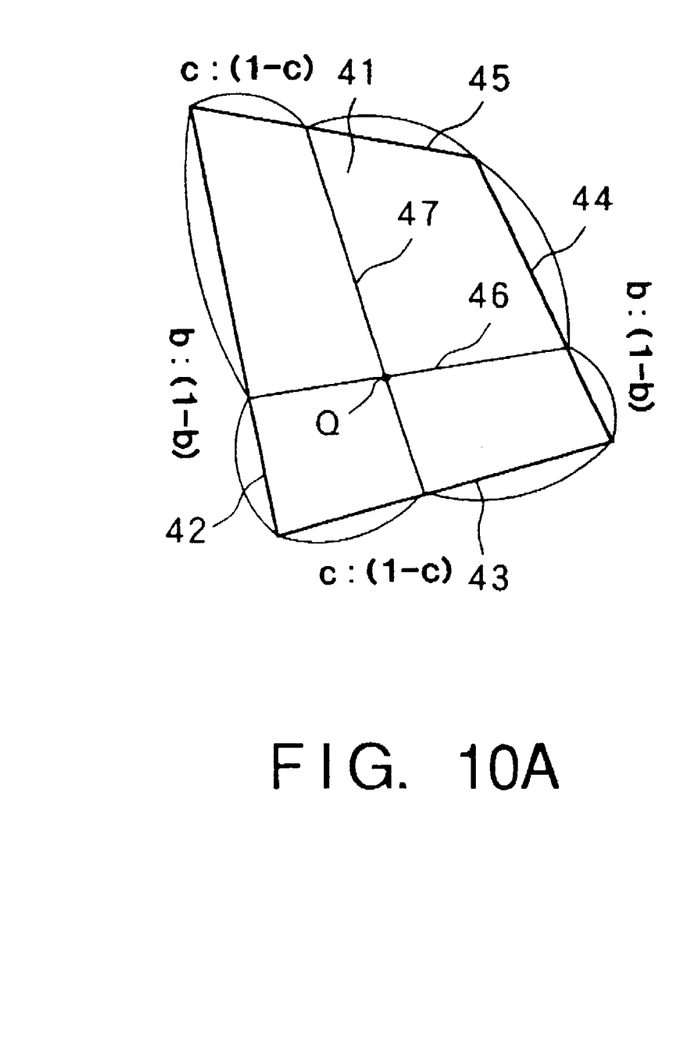
FIGS. 10A and 10B are diagrams for describing transformation computation based upon original image data according to this embodiment.
Figure 10B:
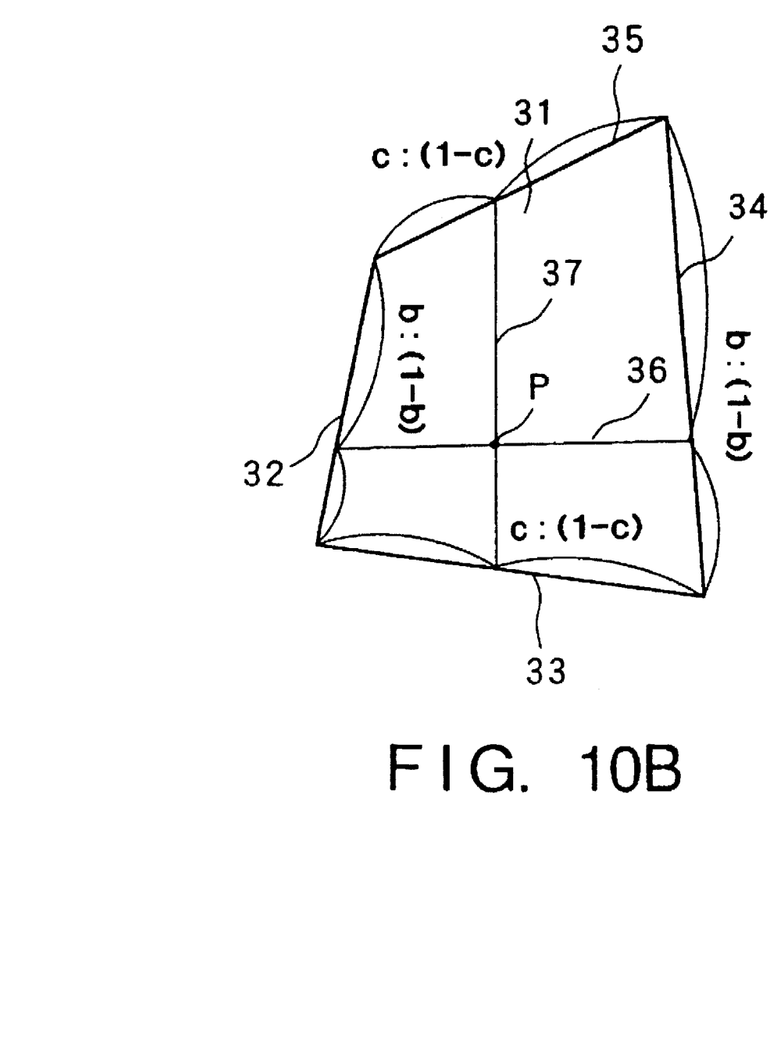

Finally, reference will be had to FIGS. 10A and 10B to describe an exemplary case in which the most basic minute quadrangle on the original-image side and an internally divided quadrangle after transformation are both convex quadrangles. FIGS. 10A and 10B are diagrams for describing transformation calculation based upon the original-image data in this embodiment.

In FIG. 10A, assume that a quadrangle 41 is a minute quadrangular area on the original-image side, and assume that a quadrangle 31 in FIG. 10B is an internally divided quadrangle after transformation. In FIG. 10B, let 32, 33, 34, 35 represent the four sides of the internally divided quadrangle 31 after transformation. The two sides 32 and 34 are opposite each other, as are the two sides 33 and 35. The two opposite sides 32 and 34 are internally divided at a ratio of b:(1-b) (where 0≦b≦1) from the same direction. The two points at which these sides are internally divided are connected by a line segment 36. Similarly, the two sides 32 and 34 are opposite each other, as are the two sides 33 and 35. The two opposite sides 33 and 35 are internally divided at a ratio of c:(1-c) (where 0≦c≦1) from the same direction. The two points at which these sides are internally divided are connected by a line segment 37.

Let 42, 43, 44 and 45 represent, in an order corresponding to the four sides of the quadrangle 31 after transformation, the four sides of the quadrangle 41 on the original-image side in FIG. 10A. Here sides 42 and 44 are opposites sides, and sides 43 and 45 are opposite sides.

Under these conditions, one pixel P situated in the interior of the quadrangle 31 after transformation is selected, the value of the internal dividing ratio b which prevails when the distance between the line segment 36 and the pixel P is shortest is found, and the value of the internal dividing ratio c which prevails when the distance between the line segment 37 and the pixel P is shortest is found. Next, a line segment 46 is found which connects points at which the sides 42, 44 of the quadrangle 41 on the original-image side are partitioned at the internal dividing ratio b found above, and a line segment 47 is found which connects points at which the sides 43, 45 of the quadrangle 41 on the original-image side are partitioned at the internal dividing ratio c found above. This is followed by obtaining a pixel Q at the point of intersection between the line segments 46 and 47. The color of the pixel Q at the point of intersection becomes the color of the pixel P of the quadrangle after transformation.

When the color of the pixel Q of the corresponding minute quadrangle on the original-image side has been brought to all pixels P on the inner side of the internally divided quadrangle 31 after transformation, the arithmetic operations of steps S7 (FIG. 4) end.

Next, a case will be described in which a quadrangle is a concave quadrangle. When a quadrangle is a concave quadrangle, there are instances where pixels outside the quadrangle are discarded with the technique applied to a minute convex quadrangle, regardless of whether the minute quadrangle is one on the original-image side or one internally divided after transformation. For this reason, the above-mentioned technique cannot be applied as is. Accordingly, in the present embodiment, a method described below is used. This will be described with reference to FIG. 11.

Figure 11:
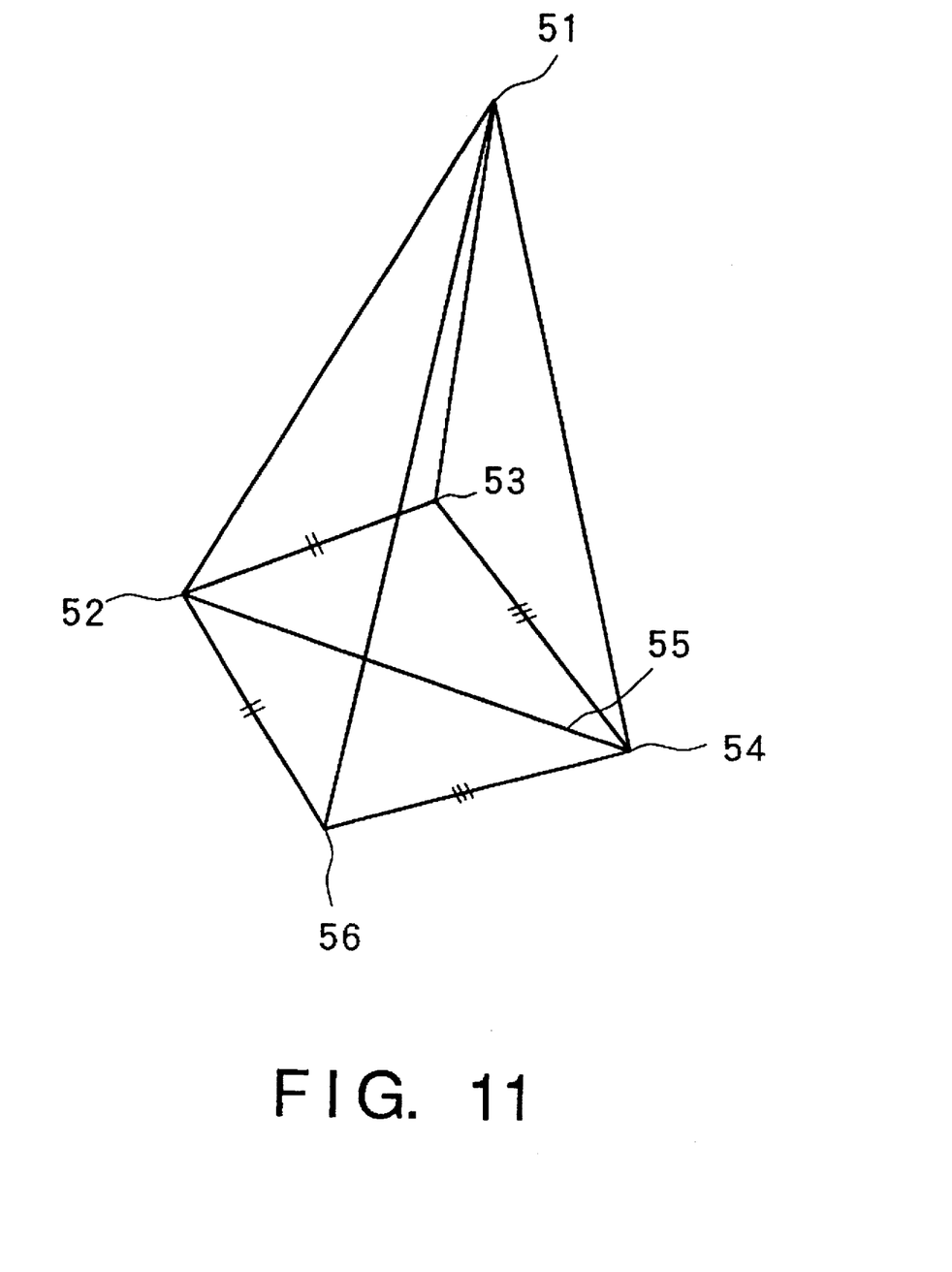
FIG. 11 is a diagram for describing transformation computation based upon original image data according to this embodiment.

FIG. 11 is a diagram for describing calculations by which a transformation is made from an original image. Let 51, 52, 53 and 54 represent the four vertices of a concave quadrangle, among which the vertex at the concavity is vertex 53. Let 56 represent a point at a position which is linearly symmetric to the vertex 53 with respect to a line segment 55 connecting the two vertices 52 and 54. Under these conditions, processing for transforming the minute quadrangle 52, 53, 51, 52 (the vertices 52 overlap, and therefore the shape is actually that of a triangle) to the minute quadrangle 52, 56, 51, 52 (the vertices 52 overlap, and therefore the shape is actually that of a triangle) is executed by using the above-described technique for transforming a convex quadrangle.

Next, processing for transforming the minute quadrangle 54, 53, 51, 54 (the vertices 54 overlap, and therefore the shape is actually that of a triangle) to the minute quadrangle 54, 56, 51, 54 (the vertices 54 overlap, and therefore the shape is actually that of a triangle) is executed by using the above-described technique for transforming a convex quadrangle.

If this expedient is adopted, the concave quadrangle 51, 52, 53, 54 can be converted into the convex quadrangle 51, 52, 56, 54. If this is done, the processing of step S7 is such that even if a concave quadrangle is involved, calculations can be performed to effect a conversion into a concave quadrangle at one time. This makes it possible to perform processing without problems.

Figure 12:
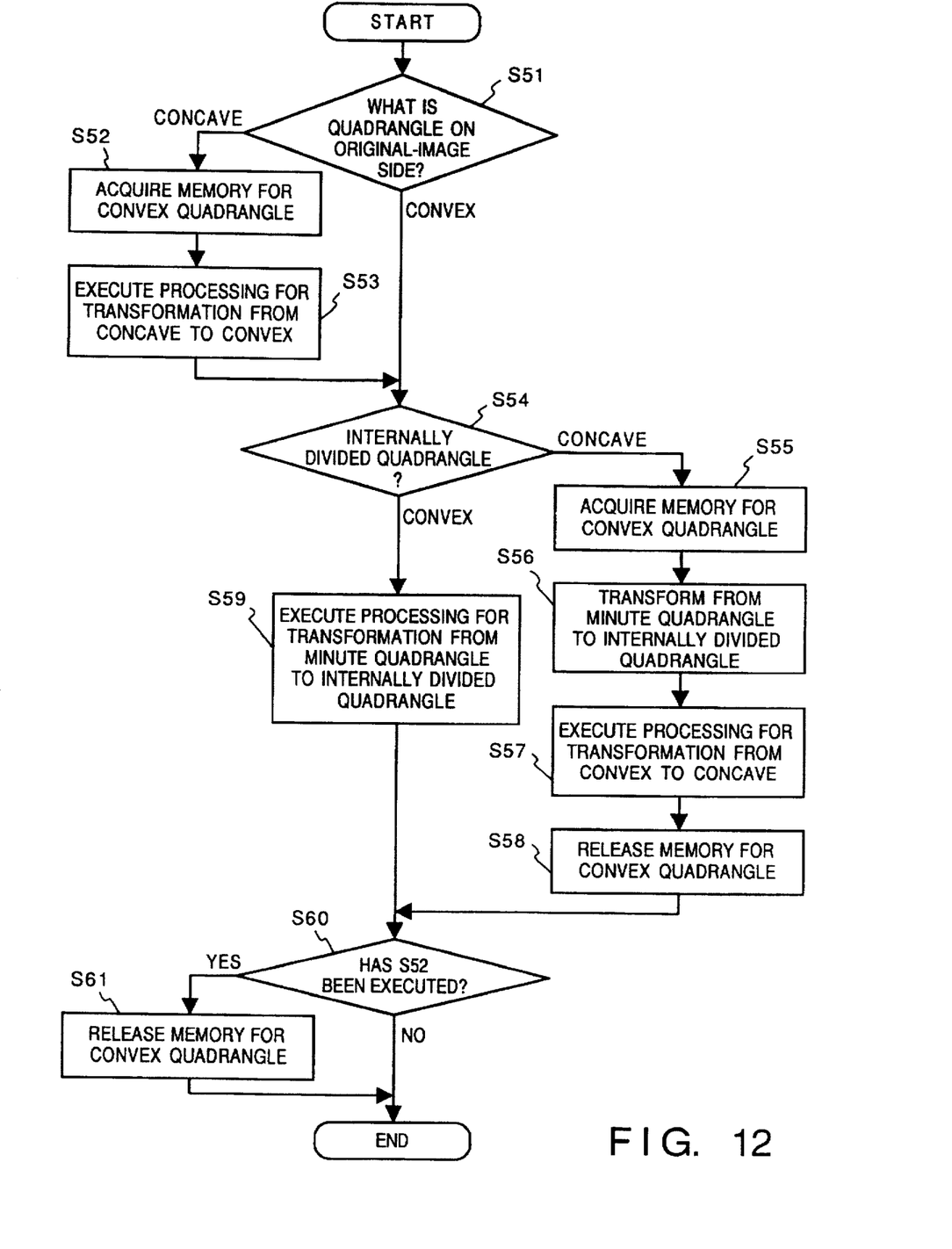
FIG. 12 is a flowchart for describing transformation processing based upon original image data according to this embodiment.

FIG. 12 is a flowchart for describing processing whereby a transformation is made from an original image according to this embodiment.

First, at step S51, it is determined whether a minute quadrangle on the original side is convex or concave. The program proceeds to step S52 if the quadrangle is concave and to step S54 if the quadrangle is convex.

If the minute quadrangle on the original side is a concave quadrangle, the program proceeds to step S52, at which a memory area for a convex quadrangle corresponding to the concave quadrangle is acquired. Next, at step S53, processing is executed for the transformation from the concave quadrangle to the convex quadrangle. This is followed by step S54, at which it is determined whether the internally divided quadrangle is convex or concave. If it is concave, the program proceeds to step S55; otherwise, the program proceeds to step S59.

If the internally divided quadrangle is a concave quadrangle, the program proceeds to step S55, at which a memory area for a convex quadrangle corresponding to the concave quadrangle is acquired. Next, at step S56, processing (described earlier with reference to FIGS. 10A and 10B) is executed for the transformation from the minute convex quadrangle on the original side or the convex quadrangle created at step S53 to the convex quadrangle for which the memory area was acquired at step S55. This is followed by step S57, at which processing for the transformation from the convex quadrangle to the concave quadrangle is performed. This processing for the transformation from the convex quadrangle to the concave quadrangle is carried out in a direction which is the opposite of that of the processing for the transformation from the concave quadrangle to the convex quadrangle. When the processing for the transformation from the convex quadrangle to the concave quadrangle at step S57 ends, the convex quadrangle for which the memory area was acquired at step S55 is no longer necessary, and this memory area is released at step S58.

If the internally divided quadrangle is a convex quadrangle, the program proceeds to step S59, at which processing (described earlier with reference to FIGS. 10A and 10B) is executed for the transformation from the minute convex quadrangle on the original side or the convex quadrangle created at step S53 to an internally divided convex quadrangle.

Next, at step S60, it is determined whether a memory area of a convex quadrangle for the original image was acquired at step S52. If such a memory was acquired, it is no longer necessary and the memory area is released at step S61.

The foregoing completes the calculations for the transformation from one minute quadrangle on the original-image side to the corresponding internally divided quadrangle.

It should be noted that the calculations for the transformation from a minute quadrangle on the original-image side to the corresponding internally divided quadrangle are performed for each of the two original images to create two internally divided quadrangles.

Next, step S8 in FIG. 4 is a step for color calculation. Here calculations for combined colors are performed using the colors of the corresponding pixels, which are based upon the internally divided quadrangle from the first original image and the internally divided quadrangle from the second original image found at step S7, as well as the internal dividing ratio a designated at step S5.

Let $R_0, G_0, B_0$ represent the color of one pixel in an internally divided quadrangle from the first original image, let $R_1, G_1, B_1$ represent the color of the corresponding pixel in an internally divided quadrangle from the second original image, and let the internally dividing ratio designated at step S5 be a. Under these conditions, the color R, G, B of a pixel obtained by color calculations will be found as follows:

$$R = a \times R_0 + (1-a) \times R_1,$$
$$G = a \times G_0 + (1-a) \times G_1,$$
$$B = a \times B_0 + (1-a) \times B_1$$

Step S9 is a step for judging whether the calculation of minute quadrangles has ended. If processing has ended for all minute areas, the program proceeds to step S10. If unprocessed minute areas remain, the processing of steps S6 to S8 is applied to the next minute area.

Finally, if the transformed image that has been created is outputted at step S10 using the image output unit 116, this means that all operations are completed. The image output unit is a film output unit such as a film recorder, by way of example.

Thus, in accordance with the embodiment described above, an intermediate image is readily created from two still pictures. As a result, an intermediate image can readily be created from an image having no contour lines, such as a natural picture or painting, thus making possible new creative activities.

Further, the present invention is applicable not also to an ink-jet printer and color-laser printer but also to a thermal-transfer printer. In particular, the invention may be applied to a so-called bubble-jet printer that employs a head of the type which jets liquid droplets by utilizing film boiling that relies upon thermal energy.

It should be noted that the present invention may be applied to a system composed of a plurality of devices or to an apparatus comprising one device. It goes without saying that the present invention can be applied also to a case where the above-mentioned effects are attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for generating pixel by pixel a third image from first and second images each of which has an arbitrary shape and color, comprising:

partitioning means for automatically partitioning both the first and second images scanned by a scanner into a plurality of areas, with each of the plurality of areas including a plurality of colors, wherein the number of the areas partitioned in both the first and second images are exactly equal and each partitioned area in the first image can be different from the corresponding partitioned area in the second image with respect to a combination of size and shape;

area generating means for generating a plurality of areas of what is to be the third image, based upon the corresponding areas of the first image and second image; and color generating means for generating per pixel in each of the generated plurality of areas of the third image a color which is determined as a function of a corresponding pixel's color in each of the first and second images, wherein said color generating means generates a color per pixel according to the function:

$$R = a \times R_0 + (1-a) \times R_1,$$
$$G = a \times G_0 + (1-a) \times G_1,$$
$$B = a \times B_0 + (1-a) \times B_1,$$

where $R_0, G_0, B_0$ represent the color of the corresponding pixel in the first image, and $R_1, G_1, B_1$ represent the color of the corresponding pixel in the second image, and a represents a dividing ratio with respect to the corresponding partitioned areas of the first and second images in which the corresponding pixels are located.

2. The image processing apparatus according to claim 1, wherein the areas are minute quadrangles.

3. The image processing apparatus according to claim 1, wherein said partitioning means partitions any area that is not masked by a masking image.

4. The image processing apparatus according to claim 1, wherein said area generating means generates each areas coordinates on the third image, according to a synthesizing ratio denoting in what proportion the first image and the second image are to be mixed.

5. The image processing apparatus according to claim 1, wherein said area generating means generates each areas coordinates on the third image, according to each areas coordinates on the first image and the second image.

6. An image processing apparatus according to claim 1, wherein color generating means comprises:

corresponding pixel determining means for determining corresponding pixels in each of the plurality of areas among the first image and second image and third image;

color determining means for determining a color for the corresponding pixel in each of the plurality of areas of the third image, in accordance with colors of the corresponding pixels in each of the plurality of areas of the first image and second image.

7. An image processing apparatus according to claim 6, wherein said corresponding pixel determining means comprises:

ratio acquiring means for acquiring ratios in such a way that a pixel is selected in each of the plurality of areas of the third image and each of the ratios are acquired by acquiring a straight line, which passes the pixel to internally divide two opposite sides of each of the plurality of areas of the third image at the same ratio;

corresponding pixel locating means for locating corresponding pixels in each of the plurality of areas of the first image and second image in such a way that straight lines each to internally divide two opposite sides of each of the plurality of areas of the third image at each of the ratios acquired by said ratio acquiring means are acquired and that respective nearest pixels, in each of the plurality of areas of the first image and second image, to an intersection pixel of the straight lines are selected as the corresponding pixels in each of the plurality of areas of the first image and second image.

8. An image processing apparatus according to claim 6, wherein said color determining means determines a color for the corresponding pixel in each of the plurality of areas of the third image, by synthesizing colors of the corresponding pixels in each of the plurality of areas of the first image and second image at a given internal dividing ratio.

9. An image processing apparatus according to claim 8, wherein said given internal dividing ratio is determined based upon a location of the third image from locations of the first and second images, color determining step of determining a color for the corresponding pixel in each of the plurality of areas of the third image, in accordance with colors of the corresponding pixels in each of the plurality of areas of the first image and second image.

10. An image processing method of generating pixel by pixel a third image from first and second images each of which has an arbitrary shape and color, comprising:

a partitioning step of automatically partitioning both the first and second images scanned by a scanner into a plurality of areas, with each of the plurality of areas including a plurality of colors, wherein the number of the areas partitioned in both the first and second images are exactly equal and each partitioned area in the first image can be different from the corresponding partitioned area in the second image with respect to a combination of size and shape;

an area generating step of generating a plurality of areas of what is to be the third image, based upon the corresponding areas in the first image and second image; and a color generating step of generating per pixel in each of the generated plurality of areas of the third image a color which is determined as a function of a corresponding pixel's color in each of the first and second images, wherein said color generating step generates a color per pixel according to the function:

$R = a \times R_0 + (1-a) \times R_1,$ $G = a \times G_0 + (1-a) \times G_1,$ $B = a \times B_0 + (1-a) \times B_1,$ where $R_0$, $G_0$, $B_0$ represent the color of the corresponding pixel in the first image, and $R_1$, $G_1$, $B_1$ represent the color of the corresponding pixel in the second image, and a represents a dividing ratio with respect to the corresponding partitioned areas of the first and second images in which the corresponding pixels are located.

11. The image processing method according to claim 10, wherein the plurality of areas are each minute quadrangles.

12. The image processing method according to claim 10, wherein any area that is not masked by a masking image is partitioned at said partitioning step.

13. The image processing method according to claim 10, wherein each area coordinate of the third image is generated at said generating step, according to a synthesizing ratio denoting in what proportion the first image and the second image are to be mixed.

14. The image processing method according to claim 10, wherein each area coordinate of the third image is generated at said area generating step, according to each area coordinate of the first image and the second image.

15. An image processing method according to claim 10, wherein said color generating step comprises:

corresponding pixel determining step of determining corresponding pixels in each of the plurality of areas among the first image and second image and third image.

16. An image processing method according to claim 15, wherein said corresponding pixel determining step comprises:

ratio acquiring step of acquiring ratios in such a way that a pixel is selected in each of the plurality of areas of the third image and each of the ratios are acquired by acquiring a straight line, which passes the pixel, to internally divide two opposite sides of each of the plurality of areas of the third image at the same ratio;

corresponding pixel locating step of locating corresponding pixels in each of the plurality of areas of the first image and second image in such a way that straight lines each internally divide two opposite sides of each of the plurality of areas of the third image at each of the ratios acquired at said ratio acquiring step are acquired and that respective nearest pixels in each of the plurality of areas of the first image and second image, to an intersection pixel of the straight lines are selected as the corresponding pixels in each of the plurality of areas of the first image and second image.

17. An image processing method according to claim 15, wherein at said color determining step a color for the corresponding pixel in each of the plurality of areas of the third image is determined by synthesizing colors of the corresponding pixels in each of the plurality of areas of the first image and second image at a given internal dividing ratio.

18. An image processing method according to claim 17, wherein said given internal dividing ratio is determined based upon a location of the third image from locations of the first and second images.

* * * * *

UNITED STATES PATENT AND TRADEMARK OFFICE
CERTIFICATE OF CORRECTION

PATENT NO. : 5,684,942

DATED : November 4, 1997

INVENTOR(S) : HIROYUKI KIMURA

It is certified that error appears in the above-identified patent and that said Letters Patent is hereby corrected as shown below:

COLUMN 1

Line 57, "creating" should read --created--.

COLUMN 3

Line 5, "11" should read --111--.

COLUMN 5

Line 27, "other" should read --another--.

COLUMN 8

Line 54, "$(X_3,Y_3$" should read --$(X_3,Y_3)$--.

COLUMN 11

Line 30, "internally" should read --internal--;
    Line 44, "outputted" should read --output--; and
    Line 54, "also" should read --only--.

Signed and Sealed this

Twenty-eighth Day of April, 1998

*Attest:*

BRUCE LEHMAN

*Attesting Officer*    *Commissioner of Patents and Trademarks*